(12) United States Patent
Young

(10) Patent No.: US 11,611,444 B2
(45) Date of Patent: Mar. 21, 2023

(54) PHYSICALLY UNCLONABLE FUNCTION DEVICE, METHOD AND APPARATUS

(71) Applicant: QUANTUM BASE LIMITED, Stockport (GB)

(72) Inventor: Robert James Young, Lancaster (GB)

(73) Assignee: QUANTUM BASE LIMITED, Stockport (GB)

( * ) Notice: Subject to any disclaimer, the term of this patent is extended or adjusted under 35 U.S.C. 154(b) by 568 days.

(21) Appl. No.: 16/636,690

(22) PCT Filed: Aug. 7, 2018

(86) PCT No.: PCT/GB2018/052253
§ 371 (c)(1),
(2) Date: Feb. 5, 2020

(87) PCT Pub. No.: WO2019/030517
PCT Pub. Date: Feb. 14, 2019

(65) Prior Publication Data
US 2020/0169424 A1      May 28, 2020

(30) Foreign Application Priority Data

Aug. 10, 2017    (GB) ...................................... 1712839

(51) Int. Cl.
*H01L 29/88*    (2006.01)
*H04L 9/32*     (2006.01)
(Continued)

(52) U.S. Cl.
CPC ........ *H04L 9/3278* (2013.01); *H01L 29/0665* (2013.01); *H01L 29/165* (2013.01); *H01L 29/882* (2013.01)

(58) Field of Classification Search
CPC ....... H01L 23/576; H01L 29/0665–068; H01L 29/775; H01L 29/66439; H01L 29/66469;
(Continued)

(56) References Cited

U.S. PATENT DOCUMENTS 4,860,296 A * 8/1989 Chemla .................. H01S 3/113
372/18
5,466,949 A   11/1995 Okuno
(Continued)

FOREIGN PATENT DOCUMENTS

| GB | 2543125 A | 12/2017 |
| GB | 2543126 A | 12/2017 |
| WO | 2015150739 A1 | 10/2015 |

OTHER PUBLICATIONS

Jonathan David Roberts, Using Imperfect Semiconductor Systems for Unique Identification, Sep. 2016 (Year: 2016).*
(Continued)

*Primary Examiner* — Wasiul Haider
(74) *Attorney, Agent, or Firm* — Hoffman Warnick LLC

(57) ABSTRACT

A physically unclonable function (PUF) device 1 capable of exhibiting a unique quantum mechanical effect as a result of quantum mechanical confinement exhibited by the device 1. The device 1 comprises a group IV semiconductor heterostructure. The group IV semiconductor heterostructure may comprise Silicon/Germanium. The device 1 may comprise a group IV semiconductor resonant tunnelling diode (RTD). A Si-integrated circuit, method, use, and apparatus are also provided.

15 Claims, 5 Drawing Sheets

(51) Int. Cl.
*H01L 29/06* (2006.01)
*H01L 29/165* (2006.01)
(58) Field of Classification Search
CPC ......... H01L 39/66431; H01L 29/66462; H01L 29/778–7789; H01L 2924/13064; H01L 29/122; H01L 29/125–127; H01L 29/15–158
See application file for complete search history.

(56) References Cited

U.S. PATENT DOCUMENTS

| | | | |
|---|---|---|---|
| 9,379,184 B1* | 6/2016 | Cao | H01L 29/66969 |
| 2006/0131606 A1* | 6/2006 | Cheng | H01L 29/785 257/190 |
| 2009/0020748 A1 | 1/2009 | Jin et al. | |
| 2010/0213477 A1* | 8/2010 | Xu | H01L 33/0041 257/E33.013 |

OTHER PUBLICATIONS

E.G. Barbagiovanni et al., "Influence of interface potential on the effective mass in Ge nanostructures," Journal of Applied Physics 117, (2015), 9 pages.
B. Gassend et al., "Silicon Physical Random Functions," Massachusetts Institute of Technology, In the proceedings of the Computer and Communication Security Conference, Nov. 2002, Computation Structures Group: Memo 456, 15 pages.
A. Y. Nazzal et al., "Electronic properties and tunability in Si quantum rings," Journal of Applied Physics 98, (2005), 4 pages.
GB Search Report for corresponding GB Patent Application No. 1712839.8 dated Dec. 21, 2017, 2 pages.
J. Roberts et al., "Using Quantum Confinement to Uniquely Identify Devices," Scientific Reports, published Nov. 10, 2015, 8 pages.
International Search Report and Written Opinion for PCT Application No. PCT/GB2018/052253 dated Sep. 18, 2018, 11 pages.
Brown et al., "Comparison of Density Gradient and NEGF for 3D Simulation of a Nanowire MOSFET," Proceedings of the 2009 Spanish Conference on Electron Devices, Feb. 11-13, 2009, pp. 140-143.
Khitun et al., "Cellular Nonlinear Network Based on Semiconductor Tunneling Nanostructure," IEEE Transactions on Electron Devices, vol. 52, No. 2, Feb. 2005, pp. 183-189.
Wang et al., "Simulation Study of the Impact of Quantum Confinement on the Electrostatically Driven Performance of n-type Nanowire Transistors," IEEE Transactions on Electron Devices, vol. 62, No. 10, Oct. 2015, pp. 3229-3236.

* cited by examiner

PHYSICALLY UNCLONABLE FUNCTION DEVICE, METHOD AND APPARATUS

The present disclosure relates to a physically unclonable function (PUF) device, method and apparatus.

In particular the disclosure is concerned with PUF devices that are capable of exhibiting a unique quantum mechanical effect as a result of quantum mechanical confinement.

BACKGROUND

Many systems, ranging from wireless sensors, to mobile SIMs (subscriber identity modules) and in-car ECUs (engine control units), base security of their communications or similar on a cryptographic key, typically stored locally. Even data can have such a key associated with it, or embedded within it. For the security to be robust, it is of course important that this cryptographic key has a high degree of uniqueness, a term used in the art. Not only this, it is also important that it is difficult for a potential attacker of the cryptography to clone that key. In more practical terms, it is also desirable that the device providing the cryptographic key has the smallest possible physical and power consumption footprint, while at the same time having a low fabrication cost. The cryptographic key is alternatively or additionally defined or described as a unique identifier.

The unique identification of products leaving a manufacturer, or data leaving a device, or the like can be managed by tagging or fingerprinting those products, or that data, specifically by including a unique, difficult to clone (physical) function that can easily and repeatedly be read. A physically (sometimes referred to as physical) unclonable function (PUF) can provide such identification.

Previously, a physically unclonable function has been provided on the basis of what would commonly be considered as macroscopic physical principles. For instance, a physically unclonable function may be based on minute changes in quartz crystal oscillation frequency between different crystals, or the different capacitances between different devices as a result of different thicknesses of layers constituting those different devices, or the identification of anomalies (e.g. dead cells) in an array of memory cells. There is little doubt that these approaches do work in practice. However, they do, nevertheless, have disadvantages. It has been realised that a main reason for these disadvantages is the utilisation of macroscopic effects in the generation of the unique identifier. For instance, this might limit the uniqueness of the identifier, or make it more difficult to in some way measure, encode or otherwise define the unique identifier. Also, using macroscopic effects, repeatability and consistency in the determination or generation of a unique identifier may sometimes be compromised, or require significant space or power consumption in a device that provides the identifier.

These existing PUF devices have been improved upon through the use of PUF devices capable of exhibiting a unique quantum mechanical effect as a result of quantum mechanical confinement. This is a new and exciting field of endeavour as described in the Applicant's earlier International Publication No. WO 2015/150739 the contents of which are hereby incorporated by reference.

The existing PUF devices capable of exhibiting a unique quantum mechanical effect as a result of quantum mechanical confinement exploit a property of group III-V semiconductor heterostructures. These are heterostructures that use elements from groups III and V of the periodic table. Group III of the periodic table is otherwise known as the boron group and includes boron (B), aluminium (Al), gallium (Ga), indium (In) and thallium (Tl). Group V of the periodic table is otherwise known as the nitrogen group and includes nitrogen (N), phosphorous (P), arsenic (As), antimony (Sb), and bismuth (Bi). Example group III-V semiconductor heterostructures include gallium arsenide (GaAs), aluminium arsenide (AlAs), and indium arsenide (InAs). In such group III-V semiconductor heterostructures, it is known that it is straightforward to make a finite potential well with a larger barrier and a narrow width, so as to provide quantum confined energy levels that have large energy spacings between them. Such properties enable operation at room temperature.

It is an aim of the present disclosure to improve on existing PUF devices capable of exhibiting a unique quantum mechanical effect as a result of quantum mechanical confinement, such as by reducing their manufacturing costs, or a strength or uniqueness of the PUF, or at least to provide an alternative to the existing PUF devices capable of exhibiting a unique quantum mechanical effect as a result of quantum mechanical confinement.

SUMMARY

According to the present disclosure there is provided a device, method and apparatus as set forth in the appended claims. Other features of the invention will be apparent from the dependent claims, and the description which follows.

Accordingly to a first aspect, there is provided a physically unclonable function (PUF) device capable of exhibiting a unique quantum mechanical effect as a result of quantum mechanical confinement exhibited by the device, characterised in that the device comprises a group IV semiconductor heterostructure.

Here, "a group IV semiconductor heterostructure" refers to a heterostructure that uses elements from group IV of the periodic table. Group IV of the periodic table is otherwise known as the carbon group and includes carbon (C), silicon (Si), germanium (Ge), tin (Sn), and lead (Pb). The group IV semiconductor heterostructure is part of the PUF device that defines, promotes or facilitates the quantum mechanical confinement.

It will be appreciated that a group IV semiconductor heterostructure may additionally contain dopants, oxides, or impurities that do not belong to group IV of the periodic table. Therefore, it will be appreciated that "a group IV semiconductor heterostructure" does not mean that the heterostructure only contains elements from group IV of the periodic table. Instead, it will be appreciated that the group IV semiconductor heterostructure contains elements that are predominantly from group IV of the periodic table.

Unlike the existing PUF devices capable of exhibiting a unique quantum mechanical effect as a result of quantum mechanical confinement exhibited by the device, the device of the first aspect uses a group IV semiconductor heterostructure. To the inventor's knowledge, the use of group IV semiconductor heterostructures in PUF devices exhibiting a unique quantum mechanical effect as a result of quantum mechanical confinement exhibited by the device has not previously been disclosed. This is perhaps not surprising given that within the general field of semiconductor devices, group III-V semiconductor heterostructures are known to have better performance (i.e. a faster, such as by providing faster switching operations) than group IV semiconductor heterostructures, especially at room temperature.

Significantly, the inventor of the present application has been able to identify that this poor performance (e.g. switching performance) in group IV semiconductor heterostructures is not relevant to the function of a PUF device capable of exhibiting a unique quantum mechanical effect. This was surprising and unexpected. Despite the general prejudice against the use of group IV semiconductor heterostructures, the inventor of the present application has identified that satisfactory, and perhaps even beneficial, performance for a PUF device can be obtained using group IV semiconductor heterostructures. This has the added and significant benefit of more cost effective and/or simpler manufacture of PUF devices because they can be made using group IV semiconductor fabrication. PUF devices also have a wider potential application as a result. For example, the PUF devices can be integrated into group IV integrated circuits that may use CMOS technology. Therefore, the inventor of the present application has been able to obtain significant technical benefits through the use of group IV semiconductor heterostructures in a PUF device.

The PUF device may comprise two or more different group IV semiconductor materials.

The PUF device may comprise nanostructures such as quantum dots embedded between layers of group IV semiconductor materials.

The PUF device may comprise one or more Si-based heterostructures. The PUF device may be a Si-based heterostructure device. The PUF device may be a Si-based heterostructure device that comprises at least two Si regions/layers separated by a barrier region/layer.

The PUF device may comprise one or more Si/SiGe heterostructures. The PUF device may be a Si/SiGe heterostructure device.

The PUF device may comprise one or more $Si/Si_{1-x}Ge_x$ heterostructures. The PUF device may be a $Si/Si_{1-x}Ge_x$ heterostructure device.

The PUF device may be a $Si/Si_{1-x}Ge_x$ heterostructure device comprising $Si_{1-y}Ge_y$ nanostructures such as quantum dots. The $Si_{1-y}Ge_y$ may be Ge nanostructures (i.e. when y=1). Significantly, the PUF device of this example comprises nanostructures, e.g. quantum dot(s), with quantum confinement in more than one spatial dimension (all 3 for quantum dots). This increases the complexity of the current-voltage spectrum expected, and so the amount of information that is possible to be extracted when implementing as a PUF devices is also increased accordingly. Ge and Si have different lattice constants, so incorporating Ge-based structures in a Si lattice induces strain. Quantum dots have a relatively small volume, so this helps to limit the strain that is incorporated into the structure. Therefore, the use of this structure in a PUF application achieves significant, unexpected advantages.

The PUF device may comprise a resonant tunnelling diode (RTD). That is, the one or more group IV semiconductor heterostructures of the PUF device may form a RTD. The RTD may be a resonant interband tunnelling diode (RITD). The RTD may be a Si based RTD, a Si/SiGe RTD or a $Si/Si_{1-x}Ge_x$ RTD. The RTD may be a $Si/Si_{1-x}Ge_x$ RTD comprising $Si_{1-y}Ge_y$ nanostructures such as quantum dots. The RTD is part of the PUF device that defines, promotes or facilitates the quantum mechanical confinement.

RTDs typically comprise heterostructures with a bandgap profile that forms a finite potential well. Conduction through the tunnel junctions happens at preferential voltages where the Fermi level aligns with the quantum confined energy levels. In GaAs (a group III-V semiconductor) it is straightforward to make a finite potential well with a large barrier and a narrow width, providing quantum confined energy levels that have large energy spacings between them. This enables operation at room temperature. For example, GaAs and AlAs (another group III-V semiconductor) have roughly the same lattice constant, but very different bandgaps. InAs (another group III-V semiconductor) is often used in the well region of a GaAs or InP (another group III-V semiconductor) based RTD as it has a very small bandgap, and although its lattice constant is very different only a few monolayers are required.

While it is known within the general field of semiconductors that RTDs can be fabricated using a group IV semiconductor, such as silicon, it is also known that such RTDs are inferior to group III-V semiconductor RTDs. As a result, group IV semiconductor RTDs have received little commercial attention. To the inventor's knowledge, it has not received any attention in the field of PUF devices capable of exhibiting a unique quantum mechanical effect as a result of quantum mechanical confinement exhibited by the device. That is, there is a general bias against using RTDs fabricated using a group IV semiconductor, and there is certainly no teaching toward the specific and advantageous use of a PUF based on one or more RTDs fabricated using a group IV semiconductor, despite the advantages.

For group IV semiconductors, such as silicon, the challenge to create an RTD is more significant than group III-V semiconductors. While silicon and germanium can be combined to create heterostructures, the contrast in bandgap is not very significant, and there are limited conduction band and valence band discontinuities between Si and SiGe alloys. This means that group IV semiconductor based RTDs are not able to operate in as rapid a manner as group III-V semiconductor based RTDs, especially at room temperature. This is significant because RTDs have traditionally been used for rapid switching operations. For diodes operating as switches, a key figure of merit is the on-off ratio. For an RTD this is the peak-to-valley current ratio. For current SiGe based RTDs, the peak-to-valley current ratio is around 3 at room temperature. By contrast, for group III-V semiconductor based RTDs such as InP and GaAS, the peak-to-valley current ratio can reach up to 150.

Therefore, a potential reason for the prejudice against group IV semiconductor based RTDs is that RTDs are normally used for their potential to operate in a very rapid manner. As a result, it is perhaps not surprising that group IV semiconductor based RTDs have received little commercial attention and remain a niche academic endeavour.

Significantly and counter-intuitively, the inventor of the present application has realised that for PUF applications, the peak-to-valley current ratio is not an important parameter. Instead, the inventor of the present application has identified that the position of the resonant peak is important for PUF applications. In particular, the position of the resonant peak provides a method to fingerprint the device. The inventor has realised that the position of the resonant peak can be easily read by taking the differential of the current-voltage characteristic even with a peak-to-valley current ratio approaching 1. Therefore, the present inventor has advantageously realised that the known disadvantages associated with group IV semiconductor RTDs are not at all relevant for PUF applications.

Another potential reason for the prejudice against group IV semiconductor based RTDs is the rapid advancements in fabrication for group IV semiconductors. For example, current silicon fabrication processes have feature sizes <15 nm. This means that the PUF device of the present disclosure may be manufactured in a fabrication process having a minimum feature size of less than 15 nm.

It is known that as device dimensions shrink quantum effects such as confinement and tunnelling start to play a significant role. Quantum confinement shifts the threshold voltage and the leakage current increases due to source-to-drain tunnelling. This is disclosed in Brown, Andrew R., et al. "Comparison of density gradient and NEGF for 3D simulation of a nanowire MOSFET." *Electron Devices, 2009. CDE 2009. Spanish Conference on. IEEE,* 2009 and Wang, Yijiao, et al. "Simulation study of the impact of quantum confinement on the electrostatically driven performance of n-type nanowire transistors." *IEEE Transactions on Electron Devices* 62.10 (2015): 3229-3236. The contents of which are hereby incorporated by reference.

The increased quantum confinement and tunnelling effects as device dimensions decrease are significant at least because the increased leakage current means the RTD is unable to be turned off and as such no longer functions as a switch. In addition, in low power applications such an RTD will drain the power source (e.g. a battery) very quickly. Therefore, the key point for group IV semiconductor based RTDs such as Si/SiGe RTDs is that the extra tunnelling and quantum confinement would make them perform even worse as switches when these extra quantum effects are taken into account. Therefore, it is perhaps not surprising that fabricating RTDs using group IV semiconductors has received little attention.

Significantly, however, the inventor of the present application has realised that the problem of implementing group IV semiconductor based RTDs as fast switches actually, and counter intuitively, provides a benefit when implementing them as PUF devices. In particular, the inventor of the present application as realised that the extra degrees of confinement and tunnelling present in modern fabrication processes makes the resonant tunnelling more sensitive to imperfections (or the exact width of the well) in more than one dimension. This significantly and advantageously increases the amount of information that can be extracted from measuring each PUF device.

Therefore, not only has the present inventor realised that the existing prejudices against group IV semiconductor based RTDs are not relevant for PUF devices capable of exhibiting a unique quantum mechanical effect as a result of quantum mechanical confinement exhibited by the device, the present inventor has also realised that group IV semiconductor based RTDs also have added technical benefits when used in PUF devices capable of exhibiting a unique quantum mechanical effect as a result of quantum mechanical confinement exhibited by the device.

The RTD may comprise a first doped layer, a first barrier layer, a well layer, a second barrier layer, and a second doped layer. The RTD may be fabricated on a group IV semiconductor substrate such as a Si substrate. The barrier layers may be formed of a group IV semiconductor material having a large bandgap. The well layers may be formed of a group IV semiconductor material having a small bandgap.

The PUF device may comprise two RTDs connected in series through a nanostructure such as a quantum dot(s). This structure is known for use in cellular nonlinear networks (an application unrelated to PUF devices) and is disclosed in Khitun, Alexander, and Kang L. Wang. "Cellular nonlinear network based on semiconductor tunneling nanostructure." *IEEE Transactions on Electron Devices* 52.2 (2005): 183-189. The contents of which are hereby incorporated by reference. The PUF device may comprise six layers of two group IV semiconductor materials with a nanostructure such as a quantum dot(s). The layers of the first of the two group IV semiconductor materials may have a large bandgap, and act as a barrier layer. The layers of the second of the two group IV semiconductor materials may have a small bandgap, and act as a quantum well. The two group IV semiconductor materials may be silicon and germanium. The nanostructure may have a small bandgap.

The PUF device may comprise a first barrier layer formed on a substrate, a first well layer formed on the first barrier layer and, a second barrier layer formed on the first well layer. A nanostructure may be formed on the second barrier layer. A third barrier layer may be formed on the nanostructure. A second well layer may be formed on the third barrier layer. A fourth barrier layer may be formed on the second well layer. The first and second well layers may be formed of a group IV semiconductor material having a small bandgap. The barrier layers may be formed of a group IV semiconductor material having a large bandgap. The nanostructure may be a quantum dot(s) and may have a small bandgap.

The substrate may be a Si substrate. The barrier layers may be Si barrier layers. The well layers may be $Si_{1-x}Ge_x$ well layers. The nanostructure may be a $Si_{1-y}Ge_y$ nanostructure, such as a quantum dot(s). The nanostructure may be a Ge quantum dot(s).

This design contains nanostructures, e.g. quantum dot(s), with quantum confinement in more than one spatial dimension (all 3 for quantum dots). This increases the complexity of the current-voltage spectrum expected, and so the amount of information that is possible to be extracted when implementing as a PUF devices is also increased accordingly. Ge and Si have different lattice constants, so incorporating Ge-based structures in a Si lattice induces strain. Quantum dots have a relatively small volume, so this helps to limit the strain that is incorporated into the structure. Therefore, the use of this structure in a PUF application achieves significant, unexpected advantages.

The PUF device may be integrated into a Si integrated circuit. Advantageously, this means that the PUF device can be incorporated into the process for fabricating a Si integrated circuit. This may result in significant savings in terms of costs and complexities of implementing PUF devices. The Si integrated circuit may be a complementary metal oxide semiconductor (CMOS) integrated circuit.

The PUF device may exhibit quantum confinement in at least one dimension, in at least two dimensions, or in at least three dimensions.

The PUF device may be a structure that has a lateral structure, for example a lateral tunnelling structure. The PUF device may be a diode with a lateral tunnelling structure. The PUF device may be an RTD that has a lateral resonant tunnelling structure. The RTD may have a double barrier lateral resonant tunnelling structure. The RTD may comprise a nanostructure, a first terminal, a second terminal, and barrier to separate the nanostructure from the first terminal and the second terminal. The nanostructure, barrier, and terminals may be provided along a plane to provide the lateral tunnelling structure. In this example, the PUF device has a double-barrier potential well structure such that the quantum confined energy level/s show quantum tunnelling at room temperature. Fabrication imperfections may lead to geometric differences in the well and hence may allow the structure to be used as a PUF.

The nanostructure, first terminal, and second terminal may be made of a group IV semiconductor material, such as silicon. The first terminal and second terminal may be doped, and are preferably highly doped. The nanostructure may be doped, e.g. lightly doped or undoped. The first terminal and second terminal may both be n-doped, and the nanostructure may be undoped or lightly n-doped. The first terminal and second terminal may both be p-doped, and the nanostructure may be undoped or lightly p-doped. The nanostructure may be a quantum dot.

The barrier may comprise a compound of silicon and oxygen, and is most preferably silicon dioxide. The nanostructure, first terminal, second terminal and barrier may be disposed on an insulation layer, which may in turn be disposed on a semiconductor substrate layer. It will be appreciated, that the PUF device of this example may have a structure which, laterally, comprises highly doped silicon—silicon dioxide—undoped/lightly doped silicon (the nanostructure/quantum dot)—silicon dioxide—highly doped silicon. The PUF device structure is thus a heterostructure due at least to the presence of the silicon dioxide barrier that separates the semiconducting regions. In other words, the PUF device structure is a heterostructure at least due to the presence of the silicon dioxide barrier that enables tunnelling to take place.

The PUF device may be manufactured using silicon-on-insulator technology. In particular, a silicon-on-insulator wafer i.e. a layered silicon-insulator-silicon substrate may be provided. The silicon-on-insulator wafer may comprise a silicon substrate layer, an insulator layer disposed on top of the silicon substrate layer, and a device layer disposed on top of the insulator layer. The device layer may then be etched to leave a bowtie pattern of device layer remaining. Subsequently, an oxidisation and annealing process may be performed to form the barrier to separate the nanostructure from the terminals.

According to a second aspect of the disclosure, there is provided a Si integrated circuit comprising a PUF device according to the first aspect of the disclosure.

According to a third aspect of the disclosure, there is provided a method of determining or generating a unique identifier for a device, the device exhibiting quantum mechanical confinement, the method comprising: measuring (e.g. electrically) a unique quantum mechanical effect of the device that results from the quantum mechanical confinement; and using the measurement to determine or generate the unique identifier, characterised by the device exhibiting quantum mechanical confinement comprising a group IV semiconductor heterostructure.

The device may be a PUF device according to the first aspect of the disclosure.

The measurement may comprise measuring a unique quantum mechanical spectrum of the device.

Using the measurement to generate the unique identifier may comprise encoding and/or storing the result of the measurement as the unique identifier.

The method may comprise heating the device that exhibits quantum mechanical confinement to change the unique quantum mechanical effect of the device, and to therefore facilitate the provision of a new unique identifier for the device.

The heating may be undertaken using a dedicated heater, and/or by passing a current through the device.

At least a part of the method may be undertaken by another device that comprises and/or is in (e.g. electrical and/or optical) connection with the device that exhibits quantum mechanical confinement.

At least in use, the effect may be arranged to be measurable by the other device in order to determine or generate a unique identifier for the other device, using the unique identifier of the device that exhibits quantum mechanical confinement.

The other device may encode and/or store the unique identifier.

The method may comprise comparing the determined or generated unique identifier of the device that exhibits quantum mechanical confinement with one or more identifiers stored by and/or stored in the other device. The method may further comprise preventing or permitting certain functionality of the other device if the determined or generated unique identifier of the device that exhibits quantum mechanical confinement and one or more stored identifiers are the same (i.e. there is a match).

According to a fourth aspect of the disclosure, there is provided a use of a device, the device exhibiting quantum mechanical confinement, the use comprising: using the device to determine or generate a unique identifier derived or derivable from a measurable (e.g. electrical) unique quantum mechanical effect of the device that results from the quantum mechanical confinement, characterised by the device exhibiting quantum mechanical confinement comprising a group IV semiconductor heterostructure.

The device may be a PUF device according to the first aspect of the disclosure.

According to a fifth aspect of the disclosure, there is provided an apparatus, comprising: a first device, the first device comprising and/or being in connection with a second device; wherein the second device is a device that exhibits quantum mechanical confinement, and wherein the second device has a measurable (e.g. electrical) unique quantum mechanical effect that results from the quantum mechanical confinement; and at least in use, the effect is arranged to be measurable electrically by the first device to determine or generate a unique identifier for the second device and thus the first device, characterised in that the second device comprises a group IV semiconductor heterostructure.

The device may be a PUF device according to the first aspect of the disclosure.

The first device may be an integrated circuit, and: the second device may form a part of the integrated circuit.

According to a sixth aspect of the invention, there is provided a method of manufacturing a PUF device capable of exhibiting a unique quantum mechanical effect as a result of quantum mechanical confinement exhibited by the device, characterised by the method comprising manufacturing the PUF device using a group IV semiconductor heterostructure.

The method may comprise providing a wafer having a device layer comprising a group IV semiconductor material. The method may comprise etching the device layer to form a bowtie pattern. The method may comprise oxidising and annealing the device layer to form a nanostructure, a first terminal, a second terminal, and a barrier separating the first terminal and the second terminal from the nanostructure.

For the avoidance of any doubt, one or more features described in relation to any one aspect of the present invention may be used in combination with or in place of any one or more features of another aspect of the present invention, unless such replacement or combination would be understood by the skilled person from a reading of this disclosure to be mutually exclusive. For example, and more particularly, any feature described in relation to a method aspect of the present invention may be readily used in place of or in combination with any feature described in relation to a use or device aspect of the present invention.

BRIEF DESCRIPTION OF THE DRAWINGS

Examples of the present disclosure will now be described with reference to the accompanying drawings, in which.

DETAILED DESCRIPTION

Figure 1:
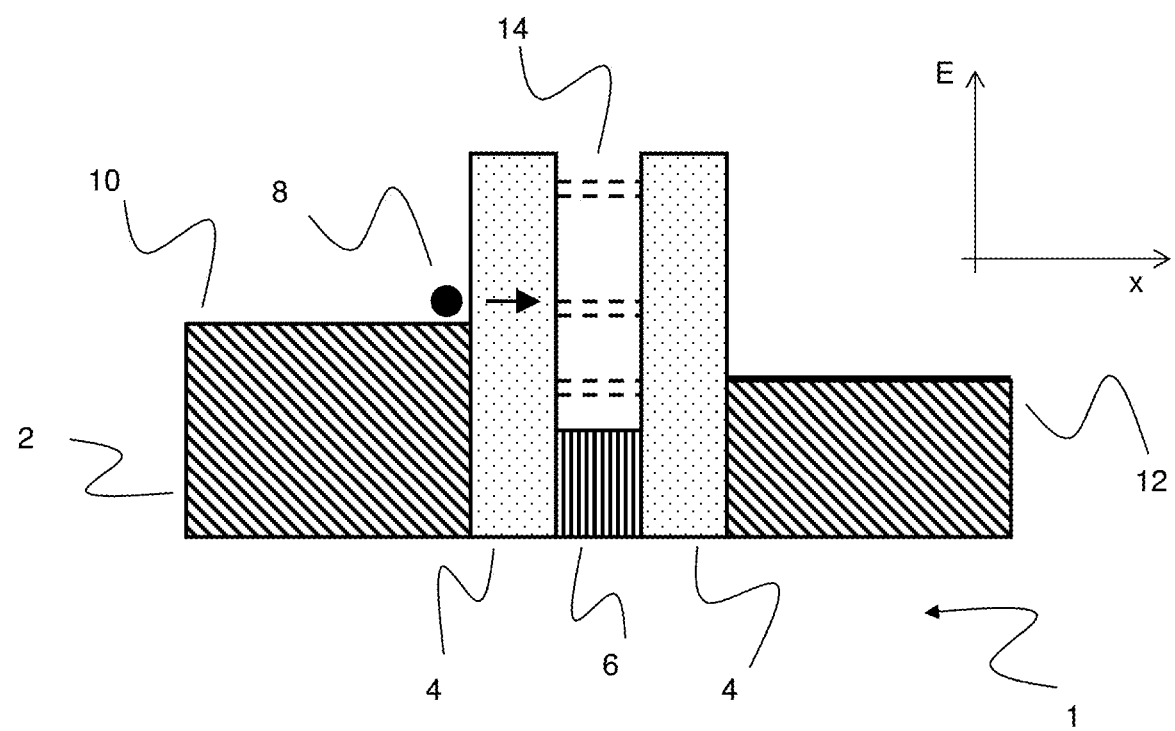
FIG. 1 schematically depicts a band structure and a mode operation of a PUF device comprising a resonant tunnelling diode, according to aspects of the present disclosure.

As mentioned above, many of the problems with existing methods for determining or generating a unique identifier is that the methods are based on macroscopic physical effects. It has been realised that at least some of the problems of the prior art may be overcome by determining and/or generating a unique identifier for a device, wherein the device is specifically one that exhibits quantum mechanical confinement. The method comprises measuring a unique quantum mechanical effect of the device that results from the quantum mechanical confinement. Furthermore, the measurement is then used to determine or generate the unique identifier for the device.

The quantum mechanical nature of the method typically allows the device used in the method to be small, and be low power. Device fabrication might also be generally cheaper than devices used in similar macroscopic methods. Perhaps most importantly, however, is that the quantum mechanical nature of the device used in the method allows for the identifier to be particularly unique. This is particularly the case when the quantum mechanical effect that is measured is a spectrum or spectra (e.g. a combination or convolution of more than one spectrum, or measurements or more than one distinct spectrum). For instance, a device exhibiting quantum mechanical confinement, particularly in two or more dimensions, may provide a unique measurable spectrum of specific confinement energy levels of electrons or holes in the structure of the device (or part thereof) that exhibits the confinement. Typically this part of the structure may be a nanostructure in the form of a layer, ring, dot, or other structure, that has spatial dimensions at or below length scales corresponding to the de Broglie wavelength of electrons in the system. The physical properties of such a nanostructure, including its atomic arrangement, size and composition, and the exact form of fields (e.g. strain, magnetic and electric) through the structure may all have an influence on the energies at which charge carriers are confined, according to solutions of the Schrödinger equation for the system. As will be appreciated, it is practically impossible to fabricate two devices that share all of these properties (and possibly more), so no two devices will be exactly the same. Therefore, the nature of confinement will not be the same, and therefore no two measurable quantum mechanical effects as a result of that confinement will be the same. Therefore, the measurable quantum mechanical effect for such a device can be used as a unique identifier for that device. In other words, it has been realised that the confining structure (or, in general, confinement) provides an efficient and effective physically (sometimes referred to as physical) unclonable function (PUF).

Principles underlying the invention, and example implementations of the invention, will now be described, by way of example only, with reference to FIGS. 1 to 5. The Figures have not been drawn to any particular scale, and are simply provided as diagrammatic aids for understanding the principles underlying the invention, and/or its application.

FIG. 1 schematically depicts a band structure of a PUF device 1 in the form of a resonant tunnelling diode (RTD), which exhibits quantum mechanical confinement, and which may provide a unique identifier according to aspects of the present disclosure.

The RTD comprises a doped material 2 in which is provided insulating material 4 that forms tunnelling barrier layers 4. The tunnelling barrier layers 4 are located either side of a nanostructure 6 which exhibits or facilitates quantum mechanical confinement of electrons 8. In use, the electrons 8 tunnel through the barrier layer 4 from a voltage tuneable conduction band 10 on one side of the nanostructure 6 to the conduction band 12 on the other side of the nanostructure 6. Charge transport through the device occurs at specific input conditions, hence the resonant nature of the device.

The nanostructure 6 could be a specific, dedicated structure, such as a ring, or dot or the like. However, additionally and/or alternatively, the nanostructure might simply imply that this particular part of the device is or has one or more dimensions which result in quantum mechanical confinement, for example at specific energy levels 14. That is, the nanostructure 6 could be a layer having nano-scale thickness.

The RTD is a group IV semiconductor RTD, and in this particular example uses silicon (Si) and germanium (Ge) as group IV semiconductor materials.

In one particular example, the barriers layers 4 of the device of FIG. 1 are Si barrier layers.

In one particular example, the nanostructure 6 of the device of FIG. 1 (or, in other embodiments, any other appropriate device) is a Ge quantum dot(s). The Ge quantum dot(s) provides quantum confinement in all three spatial dimensions. This increases the complexity of the group IV semiconductor spectrum and limits the strain incorporated into the structure, as mentioned above. In another particular example, the nanostructure 6 comprises a $Si_{1-y}Ge_y$ semiconductor material.

Figure 2:
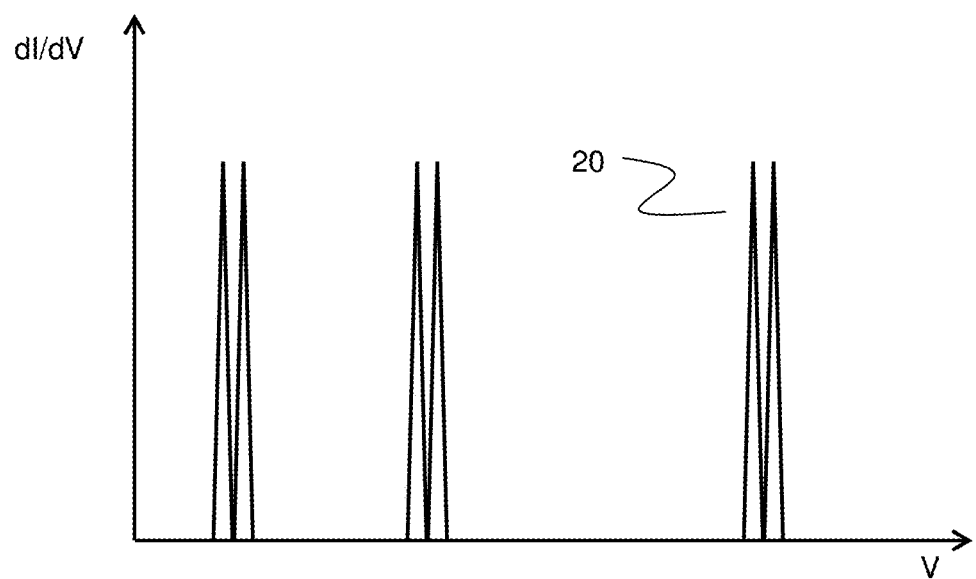
FIG. 2 schematically depicts an idealised quantum mechanical spectrum of the device of FIG. 1.

FIG. 2 shows an example of an idealised transport spectrum. The differential of current with respect to voltage is shown plotted against increasing voltage. It can be seen that a well-defined series of peaks forms the spectrum 20. The voltages at which peaks in dI/dV are measured directly relates to the confined energy levels in the nanostructure of the device of FIG. 1. These energy levels, in turn, relate directly to a unique property in the atomic composition of the nanostructure. Therefore, the structure, being unique, provides a unique spectrum, which in turn can serve as a unique identifier for the device. For instance, the spectrum for any particular device can be encoded (that is, digitised or otherwise recorded) and translated into a uniquely identifying key, which could be employed for cryptography or the like.

In the example shown in FIG. 2, charge transport has been used in the measurement to generate or determine the unique identifier of or for the device. However, other ways in which the quantum mechanical confined energy levels could be measured include capacitance-voltage measurements, and optical measurements. For instance, in the case of optical measurements, the intensity of emission is a function of photon energy. For charge transport measurement methods, or methods that rely on charge transport in some way, the carriers could be electrons or holes.

Figure 3:
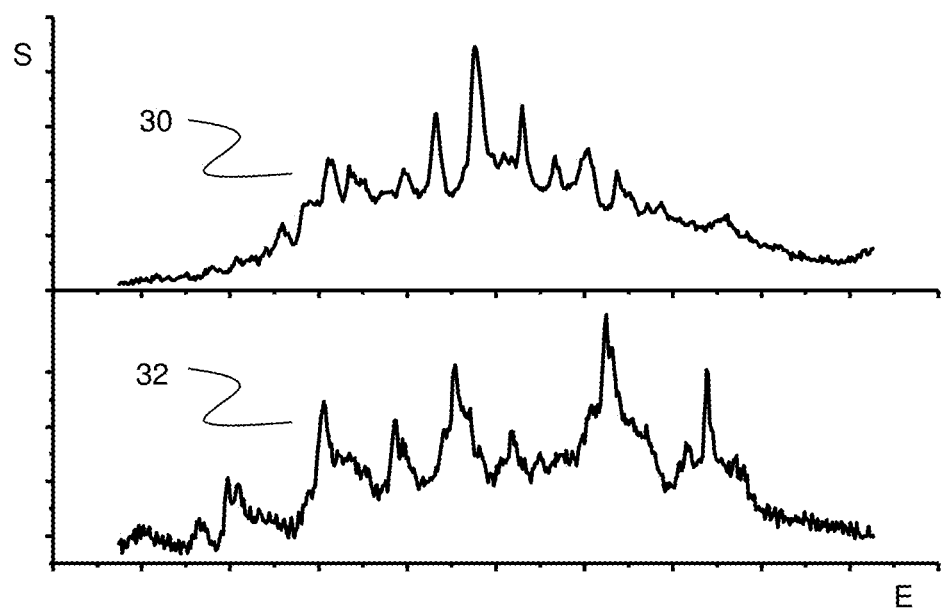
FIG. 3 depicts quantum mechanical spectra obtained from two different, real devices.

FIG. 3 shows optically measured spectra for two different, real devices; a first device 30 and a second device 32. The spectra 30, 32 in these examples are shown against an arbitrary signal level S (which represents optical output) as a function of input energy E. Each device 30, 32 has at least one nanostructure in the form of one or more quantum mechanical dots. The spectra 30, 32 shown in FIG. 2 are a result of a convolution of spectra from each quantum mechanical dot of the respective device. The convolution of different spectra makes the resulting identifier more unique (e.g. harder to copy, or equivalent to a higher degree of encryption) than say, a single spectrum.

Figure 4:
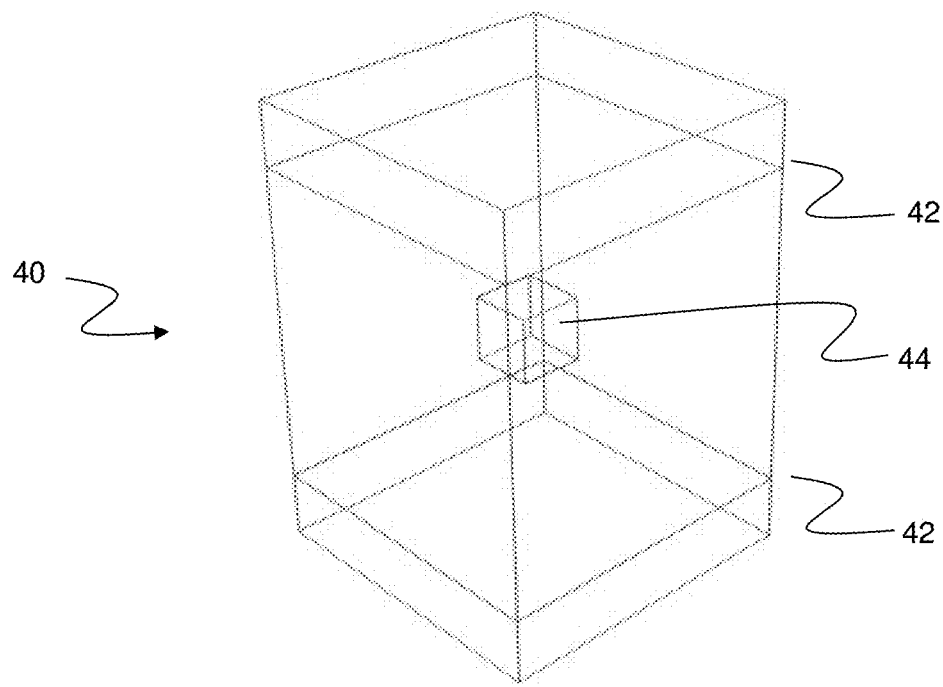
FIG. 4 schematically depicts a perspective wire-frame view of a device exhibiting quantum mechanical confinement, according to aspects of the present disclosure.

FIG. 4 schematically depicts a perspective view of a wire-frame of a device structure 40 that may be used in accordance with aspects of the present disclosure. The device comprises a group IV semiconductor heterostructure.

In this particular example, the device structure 40 comprises tunnelling barriers 42 located either side of a nanostructure 44 that exhibits 3-dimensional quantum mechanical confinement. It is noted that other parts of the structure 40 do not exhibit such 3-dimensional quantum confinement. In other examples, the nanostructure 44 could exhibit quantum mechanical confinement in only two dimensions, or in one dimension. However, the greater dimensional degree of quantum mechanical confinement is likely to make the resulting spectrum or spectra even more unique (e.g. harder to copy, or equivalent to a higher degree of encryption), increasing the uniqueness of the identifier that may be generated. In this example, the nanostructure 44 may take, for example the form of a quantum mechanical dot or similar.

Figure 5:
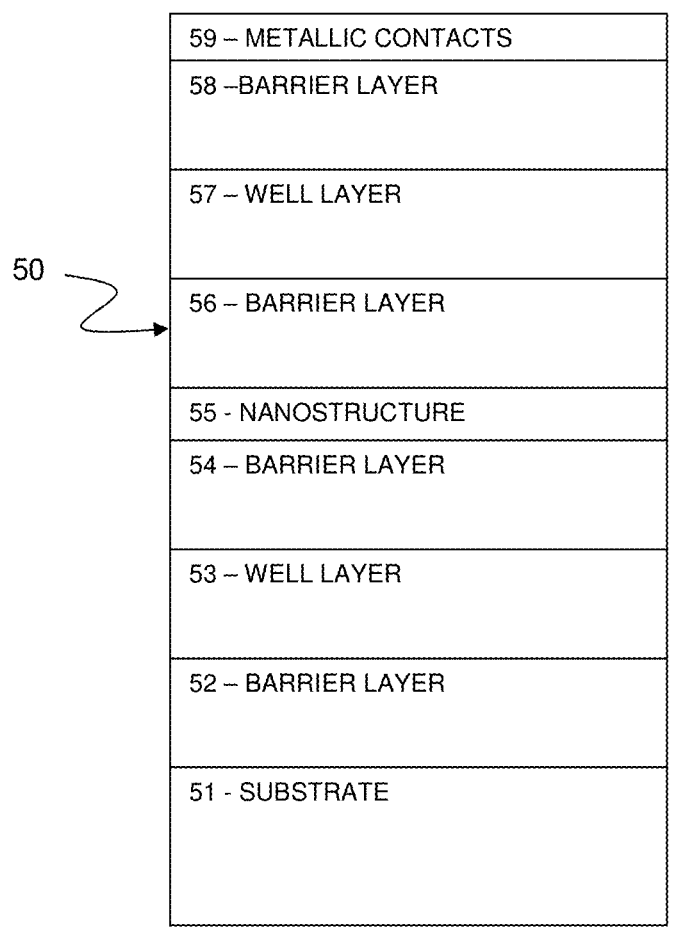
FIG. 5 schematically depicts a band structure of a PUF device according to aspects of the present disclosure.

FIG. 5 schematically depicts the structure of a PUF device 50 according to aspects of the present disclosure.

The PUF device 50 has six layers of two group IV semiconductor materials and nanostructure 55 sandwiched between the layers. The PUF device 50 has a first barrier layer 52 formed on a substrate 51, a first well layer 53 formed on the first barrier layer 51, and a second barrier layer 54 formed on the first well layer 53. The nanostructure 55 is formed on the second barrier layer 54. A third barrier layer 56 is formed on the nanostructure 55. A second well layer 57 is formed on the third barrier layer 56. A fourth barrier layer 58 is formed on the second well layer 57. In this example, metallic contacts 59 are provided on the top of the structure.

The first and second well layers 53, 57 are formed of a group IV semiconductor material having a small bandgap. The barrier layers 52, 54, 56, 58 are formed of a group IV semiconductor material having a large bandgap. The nanostructure 55 also has a small bandgap.

In one particular example of the PUF device 50 of FIG. 5, the substrate is a Si substrate that is doped to make it conductive. The barrier layers 52, 54, 56, 58 are Si barrier layers, and the well layers 53, 57 are $Si_{1-x}Ge_x$ well layers. The nanostructure 55 is Ge quantum dots. The nanostructure 55 may also be $Si_{1-y}Ge_y$ quantum dots.

In the example of FIG. 5, the PUF device 50 contains nanostructures 55, e.g. quantum dots, with quantum confinement in more than one spatial dimension (all 3 for quantum dots). This increases the complexity of the group IV semiconductor spectrum expected, and helps to limit the strain that is incorporated into the structure as explained above.

Figure 6:
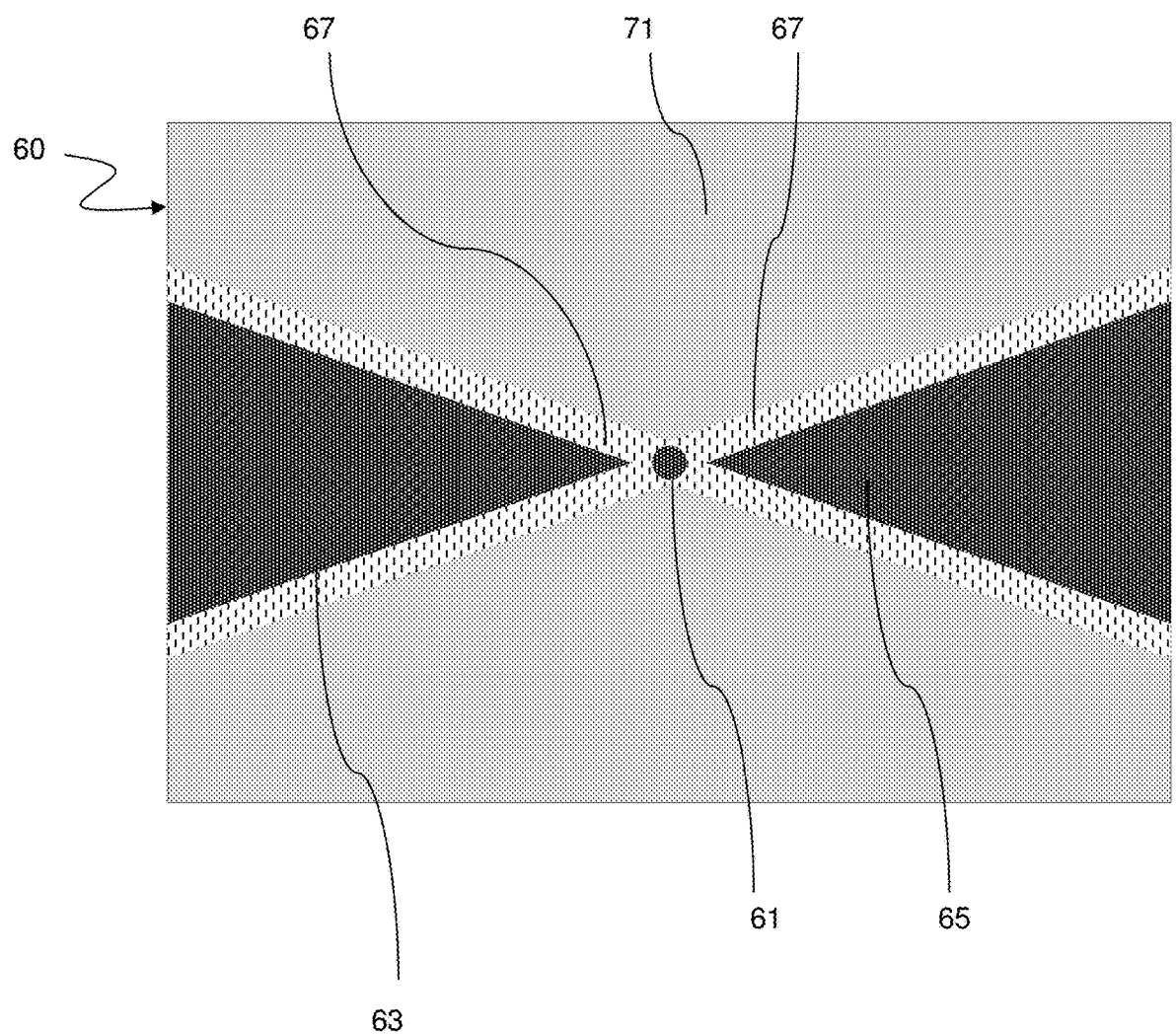
FIG. 6 shows a top-down schematic view of another PUF device according to aspects of the present disclosure.

Referring to FIG. 6, there is shown a top-down view of another PUF device 60 according to aspects of the present invention. The PUF device 60 is an RTD with a lateral tunnelling structure. The PUF device 60 has a double-barrier potential well structure such that quantum confined energy level/s show quantum tunnelling at room temperature. In other words, the PUF device 60 has two barriers that separate a central quantum dot from semiconductor terminals as explained in more detail below. Fabrication imperfections (e.g. even at the device level) will lead to geometric differences in the well and hence allow the structure to be used as a PUF.

As discussed previously, manufacturing RTDs using silicon has previously been considered, however the particular lateral double-barrier resonant tunnelling diode structure shown in FIG. 6 has to the inventor's knowledge not previously been considered, and is particularly beneficial for use as a PUF.

Benefits of the lateral double-barrier resonant tunnelling diode structure include that the bandstructure can easily be engineered by changing geometrics properties (e.g. the dot size, oxide thickness, materials, doping levels). This means the resonance conditions may be controlled to work in useful voltage ranges, e.g. around the logic levels of an integrated circuit in which the RTD is incorporated. Further, the use of a 3D quantum dot means that the density of states for the electrons/holes at the quantum confined energy levels in the well may be a delta function. This may be beneficial in making the resonant peak/s sharper. Further, the structure enables quantum confinement in more than one dimension which can increase the complexity of the current-voltage characteristic, introducing more resonant peaks, and in turn allowing more uniqueness to be extracted, and thus provides a better PUF.

Further, forming the RTD with a lateral structure helps the RTD be compatible with existing CMOS processes, which use lateral structures generally for their ease of fabrication.

Moreover, the desired RTD arrangement is particularly suited for manufacture in a lateral structure. One reason for this is because the selective oxidisation process that forms the quantum dot is geometry dependent. A vertical structure would not oxidise in the same way and it would be harder for a quantum dot to form (or at least, making a starting structure that could oxidise to leave a quantum dot would be more complex). The RTD structure of FIG. 6 also contains only one quantum dot, which is at the centre of the device through which the current flows. In a vertical structure positioning a quantum dot in the centre would be challenging. Self-organised quantum dots form randomly, and are unable to be easily placed deterministically. If the vertical device is small laterally, so as to limit inclusion to a single dot, it may be challenging to make electrical contact to the top of the structure. In the case of a III-V RTD with a vertical structure and containing only a quantum well, the top contact may be made via a gold bridge. This requires complex fabrication steps that wouldn't work if the main RTD had dimensions <100 nm. Generally the use of quantum dots is preferable to the use of wells. Quantum dots have discrete densities of states for allowed electron energies, making their tunnelling spectra more complex, allowing more information to be extracted for use as a PUF.

The PUF device 60 structure shown in FIG. 6 provides a nanostructure/quantum dot 61 that is less than 30 nm and preferably less than 25 nm in size in order to give sufficient confinement to see quantum tunnelling at room temperature. This enables the RTD to function as a better PUF device.

The PUF device 60 comprises a nanostructure 61, a first terminal 63 and a second terminal 65. A barrier 67 is provided to separate the nanostructure 61 from the first terminal 63 and the second terminal 65. The barrier 67 is a double-barrier 67. In other words the barrier 67 effectively forms two barriers 67. One barrier 67 separates the nanostructure 61 from the terminal 63, while the other barrier 67 separates the nanostructure 61 from the terminal 65. In this way, the PUF device 60 forms a resonant tunnelling diode. It will be appreciated that the nanostructure 61, barrier 67 and terminals 63, 65 are provided along a plane, and thus the PUF device 60 has a lateral structure. This contrasts with the vertical structure of the PUF device 50 shown in FIG. 5.

In this example, the nanostructure 61, first terminal 63 and second terminal 65 are made of silicon. Other group IV semiconductor materials could also be used. The first terminal 63, and second terminal 65 are highly doped. The nanostructure 61 may be undoped or lightly doped. The nanostructure 61 may be undoped or lightly p-doped, and the first terminal 63 and second terminal 65 may be p-doped. Alternatively, the nanostructure 61 may be undoped or lightly n-doped and the first terminal 63 and second terminal 65 may be n-doped. This formation of dopant concentrations may be due to the fabrication process. The device layer used to form the nanostructure 61, first terminal 63, and second terminal 65 may be heavily n or p doped prior to fabrication. When the device layer is annealed in oxygen to form the nanostructure 61, the dopants may migrate out of the nanostructure to make it less heavily doped. This effectively gives a p-i-p or n-i-n (or high-low-high) doping profile for the device layer. To make the device layer have a p-i-n, n-i-p, n-p-n, p-n-p etc. doping profile is possible in CMOS fabrication and within the scope of the present invention. However, such fabrication is more complex, and generally considered unnecessary.

The nanostructure 61, first terminal 63, second terminal, 65, and barrier 67 are provided on an insulator layer 73 (FIG. 7) which is in turn provided on a substrate layer 71.

In this example, the nanostructure 61 is a quantum dot with quantum confinement in more than one spatial dimension (all 3 for quantum dots). This increases the complexity of the current-voltage spectrum expected, and helps to limit the strain that is incorporated into the structure as explained above.

In this example, the barrier 67 comprises a compound of silicon and oxygen, and is most preferably silicon dioxide.

While not shown in FIG. 6, metal contacts may be provided to allow current to flow from the first terminal 63 to the second terminal 65.

The PUF device 60 of FIG. 6 is manufactured used silicon-on-insulator technology. Other device manufacturing technologies such as Fin Field Effect transistor (FinFET) could also be used.

Figure 7:
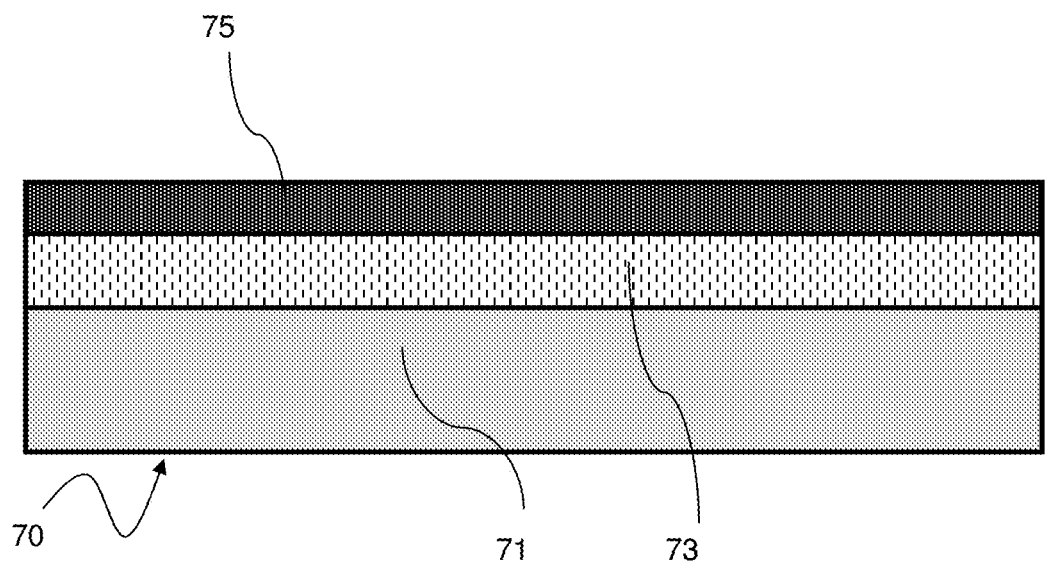
FIG. 7 shows a cross-sectional view of a semiconductor wafer used in the manufacture of the PUF device of FIG. 6.

Referring to FIG. 7, there is shown a first stage in a fabrication process of the PUF device 60 of FIG. 6. Here, a silicon-on-insulator wafer 70, i.e. a layered silicon-insulator-silicon substrate, is provided. The silicon-on-insulator wafer 70 may be fabricated using known silicon-on-insulator technology.

The silicon-on-insulator wafer 70 comprises a silicon substrate layer 71, an insulator layer 73 disposed on top of the silicon substrate layer 71, and a device layer 75 disposed on top of the insulator layer 73.

The silicon substrate layer 71 may be between 200 and 800 micrometres thick, preferably between 300 and 700 micrometres thick, and more preferable between 400 and 600 micrometres thick, and most preferably 500 micrometres thick.

The insulator layer 73 is a buried oxide layer that preferably comprises a combination of silicon and oxygen, and is most preferably a silicon dioxide layer ($SiO_2$) layer. The insulator layer 73 may comprise a sapphire layer in other examples. The thickness of the buried oxide layer 73 may be selected as appropriate by the skilled person. In some examples, the buried oxide layer 73 may be between 1.5 and 2.5 times the thickness of the device layer 75, and is preferably 2 times the thickness of the device layer 75.

The device layer 75 in this example is a silicon layer 75 which is heavily doped to be an n-type or p-type silicon layer 75. The device layer 75 may have a resistivity of less than 0.010 ohm-centimetres, or may have a resistivity of less than 0.005 ohm-centimetres. The device layer 75 may be doped during the fabrication of the wafer 70 or after the fabrication of the wafer 70. The device layer 75 has a thickness of between 5 nm and 200 nm, preferably between 10 nm and 100 nm.

Figure 8:
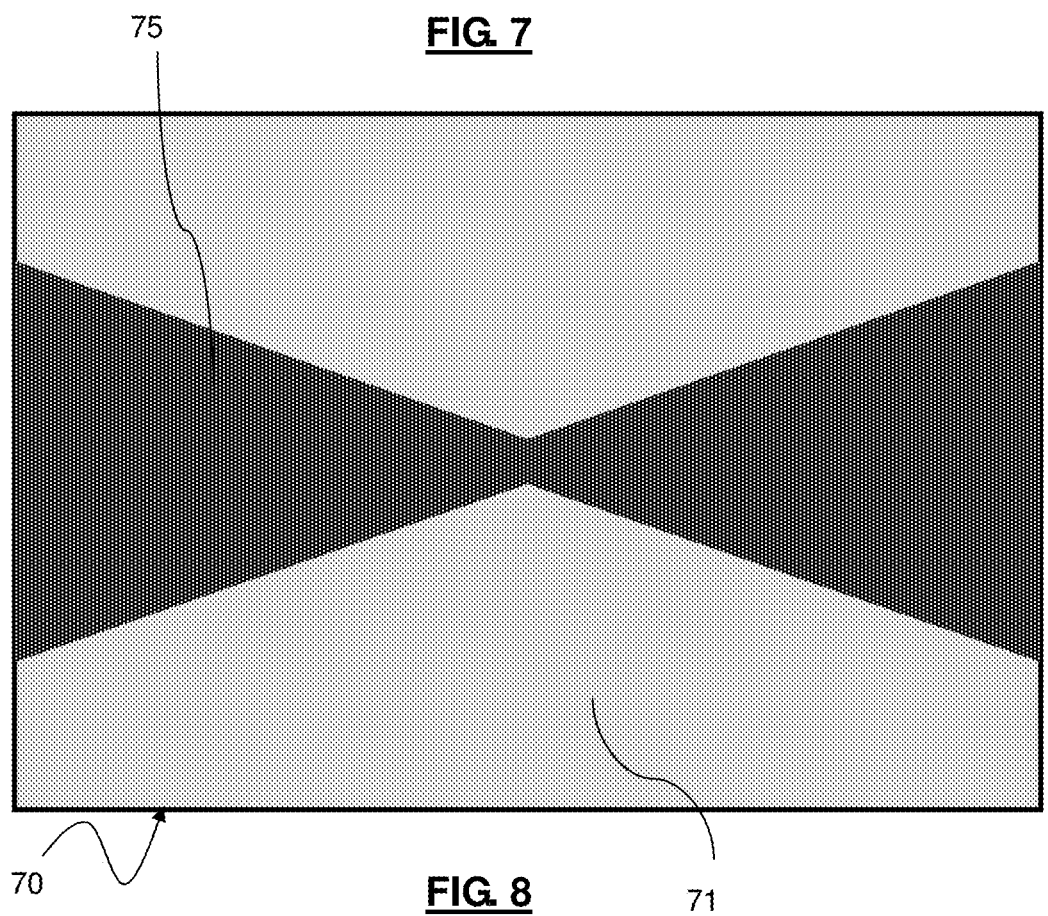
FIG. 8 shows the result of an etching process on the semiconductor wafer of FIG. 7 as part of the process of manufacturing the PUF device of FIG. 6.

Referring to FIG. 8, there is shown a second stage in the fabrication process of the PUF device 60 of FIG. 6. Here, the device layer 75 and insulator layer 73 are etched to leave a bowtie pattern of device layer 75 remaining. The minimum width of the bowtie pattern is controllable by the fabricator, and may be between 2 nm and 150 nm, and is preferably between 5 nm and 100 nm. The minimum width of the bowtie pattern affects the voltage/current properties of the PUF device 60, and may be selected as appropriate by the fabricator. The insulator layer 73 is not required to be etched in all examples of the present invention. That is, only the device layer 75 may be etched to form the bowtie pattern.

The etching may be performed using an electron-beam lithography process which may involve providing a layer of resist on the device layer 75 of the wafer 70, before etching the device layer 75 using a reactive-ion etching process. The insulator layer 73 may also be etched through if desired by the skilled person. The resist may then be removed once the etching is complete. A CMOS-lithography process could also be used.

After the stage of the fabrication process shown in FIG. 8, a selective oxidisation and annealing process is performed to form the PUF device 60. In particular, the oxidisation and annealing process results in the formation of an oxide region 67 which separates a nanostructure 61 from the terminals 63, and 65 (FIG. 6). As part of this process, the dopants tend to migrate out of the nanostructure 61, which results in the dopant concentration in the nanostructure 61 reducing as described above in relation to FIG. 6.

Subsequently, metal contacts could be formed to allow for a current to allow current to flow from the first terminal 63 to the second terminal 65.

The PUF devices described above may be integrated into a Si-integrated circuit. The Si-integrated circuit may use CMOS technology.

As described above, the quantum mechanical effect that results from quantum mechanical confinement will be 'more unique' (e.g. harder to copy, or equivalent to a higher degree of encryption) when the quantum confinement is in more that one dimension and/or when the confinement results from a more complex nanostructure, for example multiple quantum mechanical dots, or a quantum mechanical ring, versus a more simple situation of a single layer or the like. However, the uniqueness of the confinement and the resulting quantum mechanical spectra or other measurable effect may be at least partially compromised by the way in which the measurement is made and/or the way in which results are recorded. For instance, if the resolution or detail of the measurement is insufficient, this may mean that it is not possible to distinguish between two non-identical devices. That is, in terms of the 'unique' identifier (i.e. fingerprint) that is generated, this may well be the same for the different, unique devices depending on how the measurement is made/recorded. Therefore, the way in which the measurement is made and recorded may also play an important part in the generation of a unique identifier. For instance, the measurement may be encoded to a greater or lesser accuracy, depending on the level of security that is required. For instance, and in a crude example, a low level security identifier may be encoded using 8-bits or lower, whereas a much higher level of security identifier may be encoded using 128-bits or the like.

The encoding may be based on any one of a number of features, in isolation or combination, and could be based on identified certain thresholds, peaks or troughs, and also plot or peak shapes, gradients or trends.

It will be apparent that the generation (e.g. establishing) or determination (e.g. checking) of a unique identifier is important in security and cryptography and so on. It is also important that this unique identifier remains constant, so that security is maintained. However, it may be useful to change the unique identifier from time to time, for example when there is a change of security requirements. When relying on macroscopic physical effects to generate a unique identifier, it will be very difficult or even impossible to easily change the unique nature of the macroscopic physical feature. However, this is not the case when using quantum mechanical effects. For instance, simply heating (e.g. annealing) the part of the device that exhibits quantum mechanical confinement to or beyond a certain temperature may be sufficient to change the subatomic structure to an extent sufficient to change the unique confinement properties of that part of the device, and also the resulting measurable quantum mechanical effect (e.g. spectrum). It is important to note, however, that the unique set of conditions that result in the unique identifier/fingerprint is non-volatile and semi-permanent—to that extent, the conditions and identifier/fingerprint are stable, but changeable.

Heating may be achieved by using a dedicated heater (e.g. a wire or tracer passing on or through the device), and/or by passing a current through the device or part thereof that exhibits quantum mechanical confinement.

In a practical example, a first device storing or provided with an identifier may cross-check this identifier with that generated or determined using a device that exhibits quantum mechanical confinement, and which is in connection (e.g. communicative and/or measureable connection) with that quantum mechanical device. The first device may function, or fully function, when this cross-check is successful. This cross-check can be deliberately made to fail by the heating of the device that exhibits quantum mechanical confinement, as previously described. This may then prevent the first device from functioning at all, or fully functioning. This may be useful, for example, when a device is compromised or stolen. A signal or similar could be sent to the first or quantum mechanical device to trigger the heating of the device/part thereof that exhibits quantum mechanical confinement, to change the unique identifier that may be generated or determined using that device. This will then prevent the first device that comprises or is in connection with the quantum mechanical device from functioning properly, or functioning at all.

The use of a measurable electrical quantum mechanical effect, or electrically measuring a unique quantum mechanical effect (which might be defined as the same functionality from different perspectives) may be advantageous over, for example, optical properties and/or measurement. The use of an electrical based approach allows for simple, quick and effective determining and/or generating of the unique identifier, for example on a chip, or within or as part of an electric circuit or device. In contrast, optical techniques might require more complex equipment, or more numerous components, which could add to cost, complexity, weight, and so on.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

In summary, there is provided a physically unclonable function (PUF) device 1 capable of exhibiting a unique quantum mechanical effect as a result of quantum mechanical confinement exhibited by the device 1. The device 1 comprises a group IV semiconductor heterostructure. The group IV semiconductor heterostructure may comprise Silicon/Germanium. The device 1 may comprise a group IV semiconductor resonant tunnelling diode (RTD). A Si-integrated circuit, method, use, and apparatus are also provided.

Throughout this disclosure, "hetero" refers generally to their being a difference across the structure, e.g. in material or material composition. Here, "heterostructure" may refer to a semiconductor structure that comprises at least one barrier that separates at least two semiconductor layers/regions. The barrier may be a different material to the two semiconductor layers/regions. The barrier provided between the two semiconductor layers/regions may allow for tunnelling to take place, i.e. may be a tunnelling barrier. The group IV semiconductor heterostructure may thus be a group IV tunnelling structure. The two separate semiconductor layers/regions may comprise different group IV semiconductor materials, or may both comprise the same group IV semiconductor material (e.g. silicon). Alternatively or additionally, "heterostructure" may refer to a semiconductor structure where two layers/regions meet, and those layers/regions are either different semiconductor materials, or the same or similar semiconductor materials that have different doping levels. The difference may be suitable to allow the establishment of a tunnel junction, or tunnel barrier, or any kind of structure that enables tunnelling to take place, or across which tunnelling may take place.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A physically unclonable function (PUF) device exhibiting a unique quantum mechanical effect as a result of quantum mechanical confinement exhibited by the device, wherein the device comprises a group IV semiconductor heterostructure.

2. A PUF device as claimed in claim 1, wherein the device is a Si-based heterostructure device, and wherein the Si-based heterostructure device comprises at least two Si layers separated by a barrier layer.

3. A method of manufacturing a PUF device exhibiting a unique quantum mechanical effect as a result of quantum mechanical confinement exhibited by the PUF device, characterised by the method comprising manufacturing the PUF device using a group IV semiconductor heterostructure, and wherein the PUF device is as claimed in claim 2.

4. A PUF device as claimed in claim 1, wherein the device is a Si/SiGe heterostructure device.

5. A PUF device as claimed in claim 1, wherein the device is a $Si/Si_{1-x}Ge_x$ heterostructure device.

6. A PUF device as claimed in claim 1, wherein the device is a $Si/Si_{1-x}Ge_x$ heterostructure device comprising $Si_{1-y}Ge_x$ nanostructures.

7. A PUF device as claimed in claim 1, wherein the device comprises a resonant tunnelling diode (RTD).

8. A PUF device as claimed in claim 1, wherein the PUF device has a lateral resonant tunnelling structure.

9. A PUF device as claimed in claim 1, wherein the device is manufactured in a fabrication process having a minimum feature size of less than 15 nanometers (nm).

10. A PUF device as claimed in claim 1, wherein the device is integrated into a Si integrated circuit, and wherein the Si integrated circuit is a complementary metal oxide semiconductor (CMOS) integrated circuit.

11. A Si-integrated circuit comprising the PUF device as claimed in claim 1.

12. A method of determining or generating a unique identifier for a device, the device exhibiting quantum mechanical confinement, the method comprising:
    measuring electrically a unique quantum mechanical effect of the device that results from the quantum mechanical confinement; and
    using the measurement to determine or generate the unique identifier, characterised by the device exhibiting quantum mechanical confinement comprising a group IV semiconductor heterostructure.

13. A method as claimed in claim 12, wherein the device is a Si-based heterostructure device, and wherein the Si-based heterostructure device comprises at least two Si layers separated by a barrier layer.

14. Use of a device, the device exhibiting quantum mechanical confinement, the use comprising: using the device to determine or generate a unique identifier derived or derivable from a measurable electrical unique quantum mechanical effect of the device that results from the quantum mechanical confinement, characterised by the device exhibiting quantum mechanical confinement comprising a group IV semiconductor heterostructure.

15. An apparatus, comprising:
    a first device, the first device comprising and/or being in connection with a second device;
    wherein the second device is a device that exhibits quantum mechanical confinement, and wherein the second device has a measurable electrical unique quantum mechanical effect that results from the quantum mechanical confinement; and
    at least in use, the quantum mechanical effect is arranged to be measurable electrically by the first device to determine or generate a unique identifier for the second device and thus the first device,
    wherein the second device comprises a group IV semiconductor heterostructure.

* * * * *